(12) United States Patent
Song (10) Patent No.: US 8,186,482 B2
(45) Date of Patent: May 29, 2012

(54) OIL SPRAYING APPARATUS

(75) Inventor: Kyoung Chun Song, Jeollabuk-do (KR)

(73) Assignee: Hyundai Motor Company, Seoul (KR)

( * ) Notice: Subject to any disclaimer, the term of this patent is extended or adjusted under 35 U.S.C. 154(b) by 297 days.

(21) Appl. No.: 12/533,091

(22) Filed: Jul. 31, 2009

(65) Prior Publication Data

US 2010/0116594 A1    May 13, 2010

(30) Foreign Application Priority Data

Nov. 10, 2008   (KR) .................. 10-2008-0111058

(51) Int. Cl.
   *B23Q 11/12*    (2006.01)
   *F01M 1/00*     (2006.01)
   *B05B 13/06*    (2006.01)
(52) U.S. Cl. ....... 184/6.14; 184/6.26; 118/317; 239/240
(58) Field of Classification Search .............. 184/6.5, 184/6.8, 6.6, 6.7, 5, 6.14, 6.26, 6.17; 118/305, 118/306, 317, 6.14, 6.26; 239/225.1, 226, 239/240

See application file for complete search history.

(56) References Cited

U.S. PATENT DOCUMENTS

| | | | |
|---|---|---|---|
| 2,811,876 A * | 11/1957 | Batchelder ............... 408/7 |
| 2,933,093 A * | 4/1960 | Handyside ............... 134/168 R |
| 3,797,745 A * | 3/1974 | Haus ............... 239/227 |
| 4,697,965 A * | 10/1987 | Ida et al. ............... 408/56 |
| 6,283,832 B1 * | 9/2001 | Shepherd ............... 451/40 |
| 6,436,021 B2 * | 8/2002 | Nukui ............... 483/1 |
| 6,745,955 B2 * | 6/2004 | Kronz ............... 239/227 |
| 7,216,408 B2 * | 5/2007 | Boyl-Davis et al. ............... 29/33 R |
| 2001/0038039 A1 * | 11/2001 | Schultz et al. ............... 239/1 |
| 2004/0079207 A1 * | 4/2004 | Matsumura et al. ............... 82/158 |

FOREIGN PATENT DOCUMENTS

| KR | 1997-0009659 B1 | 6/1997 |
| KR | 20-0206926 | 10/2000 |

* cited by examiner

*Primary Examiner* — Michael Mansen
*Assistant Examiner* — Minh Truong
(74) *Attorney, Agent, or Firm* — Edwards Wildman Palmer LLP; Peter F. Corless (57) ABSTRACT

An oil-spraying apparatus includes: a base frame provided with a guide rail on an upper surface thereof; a mounting plate movably mounted on the guide rail by a rail block; a moving unit mounted at one side of the base frame so as to reciprocate the mounting plate on the base frame; and an oil-spraying unit mounted on an upper portion of the mounting plate, receiving compressed air and oil respectively from an air compressor and an oil distributor connected to an oil tank through an oil hose and an air hose. The apparatus can spray the oil to both the oil seal mounting hole and the one end portion of the crankshaft.

7 Claims, 10 Drawing Sheets

OIL SPRAYING APPARATUS

CROSS-REFERENCE TO RELATED APPLICATION

This application claims priority to and the benefit of Korean Patent Application No. 10-2008-0111058, filed on Nov. 10, 2008, the entire contents of which are incorporated herein by reference.

BACKGROUND OF THE INVENTION (a) Field of the Invention

The present invention relates to an oil-spraying apparatus. More particularly, the present invention relates to an oil-spraying apparatus that can spray oil simultaneously to an oil seal mounting hole formed at a front cover of an engine and a crankshaft.

(b) Description of the Related Art

Generally, vehicle makers assemble twenty to thirty thousand components through welding and assembly processes to manufacture a vehicle.

In an engine assembly process, components manufactured through a component assembly process are mounted at an interior and an exterior of an engine to manufacture a complete engine.

The engine largely consists of a cylinder block forming a combustion chamber therein and a cylinder head mounted at an upper portion of the cylinder block.

A crankshaft is mounted in the cylinder block, and a front cover formed with an oil seal mounting hole is mounted at a front surface of the cylinder block such that one end of the crankshaft is protruded toward the oil seal mounting hole.

Herein, an oil seal is press-fitted between the oil seal mounting hole and the crankshaft. Before press-fitting the oil seal, oil is generally spread to the oil seal mounting hole by means of an oil-spraying apparatus.

Since a conventional oil-spraying apparatus spreads the oil only to the oil seal mounting hole, the oil is not spread to the crankshaft. For this reason, the oil seal is misassembled or foreign substances is flowed in the oil seal mounting hole, thereby causing the crankshaft to be damaged.

In addition, workers must spread the oil to the one end of the crankshaft so as to prevent damage of the crankshaft according to the conventional oil-spraying apparatus. As a result, working processes may be increased, and productivity and working ratio of the process lines may be deteriorated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an oil-spraying apparatus having advantages of preventing damage of a crankshaft caused by misassembling and inflow of foreign substances in press-fit of an oil seal.

An oil-spraying apparatus according to an exemplary embodiment of the present invention sprays oil simultaneously to an oil seal mounting hole formed at a front cover that is mounted at a front surface of a cylinder block in an assembly process of an engine, and a crankshaft having one end portion protruded toward the oil seal mounting hole. The oil-spraying apparatus may include: a base frame provided with a guide rail on an upper surface thereof; a mounting plate movably mounted on the guide rail by a rail block; a moving unit mounted at one side of the base frame so as to reciprocate the mounting plate on the base frame; and an oil-spraying unit mounted on an upper portion of the mounting plate, receiving compressed air and oil respectively from an air compressor and an oil distributor connected to an through an oil hose and an air hose, and spraying the oil to the oil seal mounting hole and the one end portion of the crankshaft.

The moving unit may include: a first operating cylinder having a first operating rod, and mounted at the base frame through a first mounting bracket; a second operating cylinder having a second operating rod, and mounted on a lower portion of the mounting plate through a second mounting bracket in a state of facing the first operating cylinder; and a joint block connecting the first and second operating rods to each other.

One side of the mounting plate may be protruded so as to form a mounting portion at which the second mounting bracket is mounted, and the oil distributor may be mounted on the upper portion of the mounting plate.

The oil-spraying unit may include: a mounting block mounted on the upper portion of the mounting plate; a drive motor mounted at a rear portion of the mounting block through a motor bracket; a shaft housing mounted to the mounting block at a front portion of the drive motor, and having a penetration hole formed therein along a length direction thereof and an inflow hole formed at an upper portion thereof; a connector connected to the air hose and the oil hose, and flowing the compressed air and the oil supplied from the air hose and the oil hose into the inflow hole; a shaft rotatably inserted in the penetration hole of the shaft housing, and having a rear end connected to a rotation shaft of the drive motor; and an oil-spreading block mounted at a front portion of the shaft, receiving the compressed air and the oil flowed into the inflow hole through the shaft, and spraying the oil mixed with the compressed air.

The oil-spreading block may include: a body of a cylindrical shape having a first hydraulic line formed therein; a connecting portion integrally protruded from a rear surface of the body, mounted at a front end of the shaft, and having an oil pathway formed therein, the oil pathway being connected to the first hydraulic line; and a spreading portion integrally protruded from a front surface of the body along an exterior circumference thereof, and provided with an inserting recess formed at a middle portion of the front surface of the body and spraying holes formed by piercing the spreading portion from an exterior circumference to an interior circumference thereof, the spraying holes facing each other and being connected to the first hydraulic line.

A second hydraulic line connected to the oil pathway may be formed in the front portion of the shaft that is connected to the oil-spreading block.

An oil groove may be formed at a corresponding position to the inflow hole along an exterior circumference of the shaft, and an oil inlet connected to the second hydraulic line may be formed at an interior circumference of the oil groove.

Bearings may be mounted respectively at the front and rear portions of the penetration hole.

The accompanying drawings are used for describing an exemplary embodiment of the present invention, and it is to be understood that the invention is not limited to the accompanying drawings. It is also to be understood that various equivalents and variants may exist at the filing date of this specification.

DETAILED DESCRIPTION OF THE EMBODIMENTS

An exemplary embodiment of the present invention will hereinafter be described in detail with reference to the accompanying drawings. Referring to FIGS. 1-6, an oil-spraying apparatus 1 according to an exemplary embodiment of the present invention that can spray simultaneously to an oil seal mounting hole 7 formed at a front cover 5 that is mounted at a front surface of a cylinder block 3 in an assembly process of an engine, and to a crankshaft 9 having one end protruded toward the oil seal mounting hole 7 is described. An oil-spraying apparatus 1 according to an exemplary embodiment of the present invention, as shown in FIG. 2 to FIG. 5, includes a base frame 10, a mounting plate 20, a moving unit 30, and an oil-spraying unit 40.

The base frame 10 has a guide rail 11 on an upper surface thereof, and is mounted on the ground of a workshop.

Herein, an oil fan 13 is mounted at a front portion of the base frame 10 so as to prevent a residual oil flowed from the oil-spraying unit 40 from dropping to the ground.

According to the present exemplary embodiment, the mounting plate 20 is slidably mounted on the guide rail 11 through a rail block 21.

The moving unit 30 is mounted at one side of the base frame 10 so as to reciprocate the mounting plate 20 on the base frame 10.

The moving unit 30 includes first and second operating cylinders 31 and 35 and a joint block 39.

The first operating cylinder 31 has a first operating rod, and is mounted at the base frame 10 through a first mounting bracket 33.

The second operating cylinder 35 has a second operating rod, and is mounted on a lower portion of the mounting plate 20 through a second mounting bracket 37 in a state of facing the first operating cylinder 31.

Herein, one side of the mounting plate 37 is protruded so as to form a mounting portion 23 at which the second mounting bracket 37 is mounted.

In addition, the joint block 39 connects respective operating rods of the first and second operating cylinders 31 and 35 to each other.

That is, the moving unit 30 slides forward or backward the mounting plate 20 on the base frame 10 by forward operation or backward operation of the first and second operating cylinders 31 and 35.

According to the present exemplary embodiment, the oil-spraying unit 40 is mounted on an upper portion of the mounting plate 20.

The oil-spraying unit 40 receives oil and compressed air from an oil distributor 43 connected to an oil tank 41 and an air compressor 45 through an oil hose 47 and an air hose 49, respectively. The oil-spraying unit 40 sprays the oil to the oil seal mounting hole 7 and the one end of the crankshaft 9.

Figure 1:
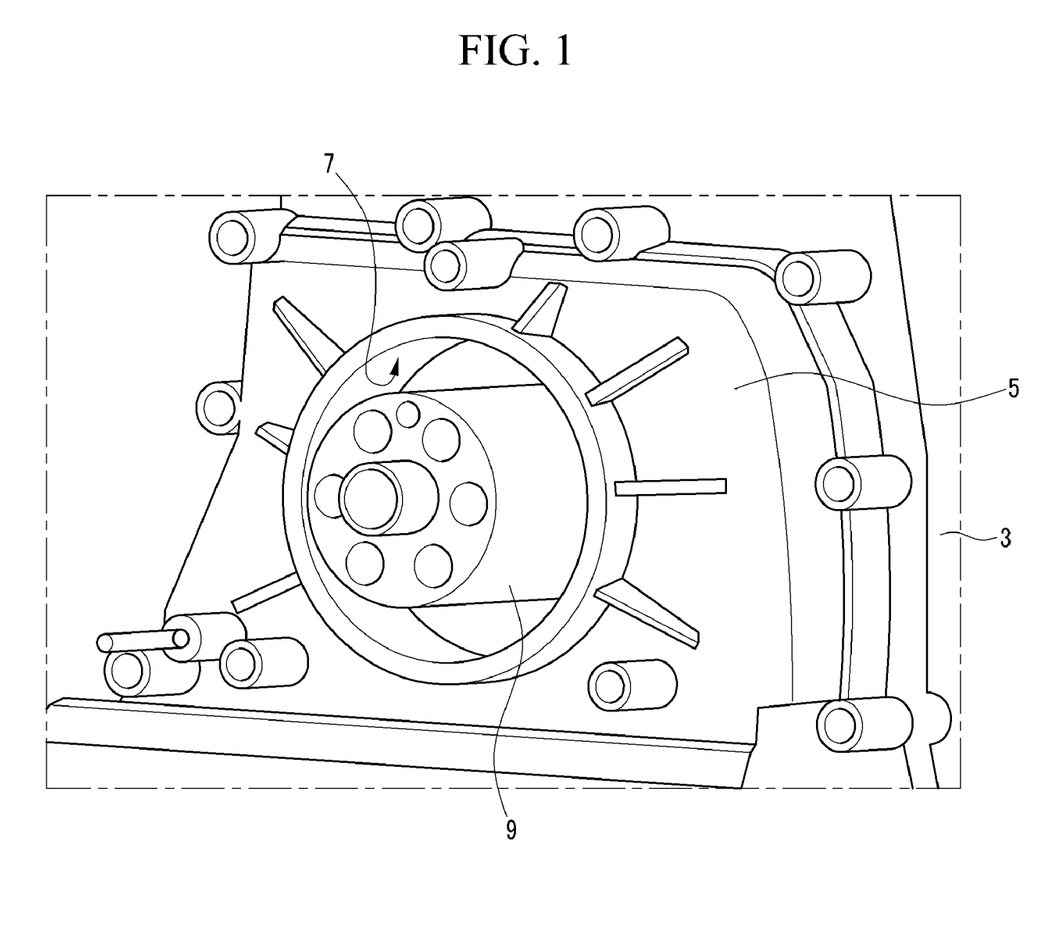
FIG. 1 is a perspective view showing a front cover and one end of a crankshaft in an engine.
Figure 2:
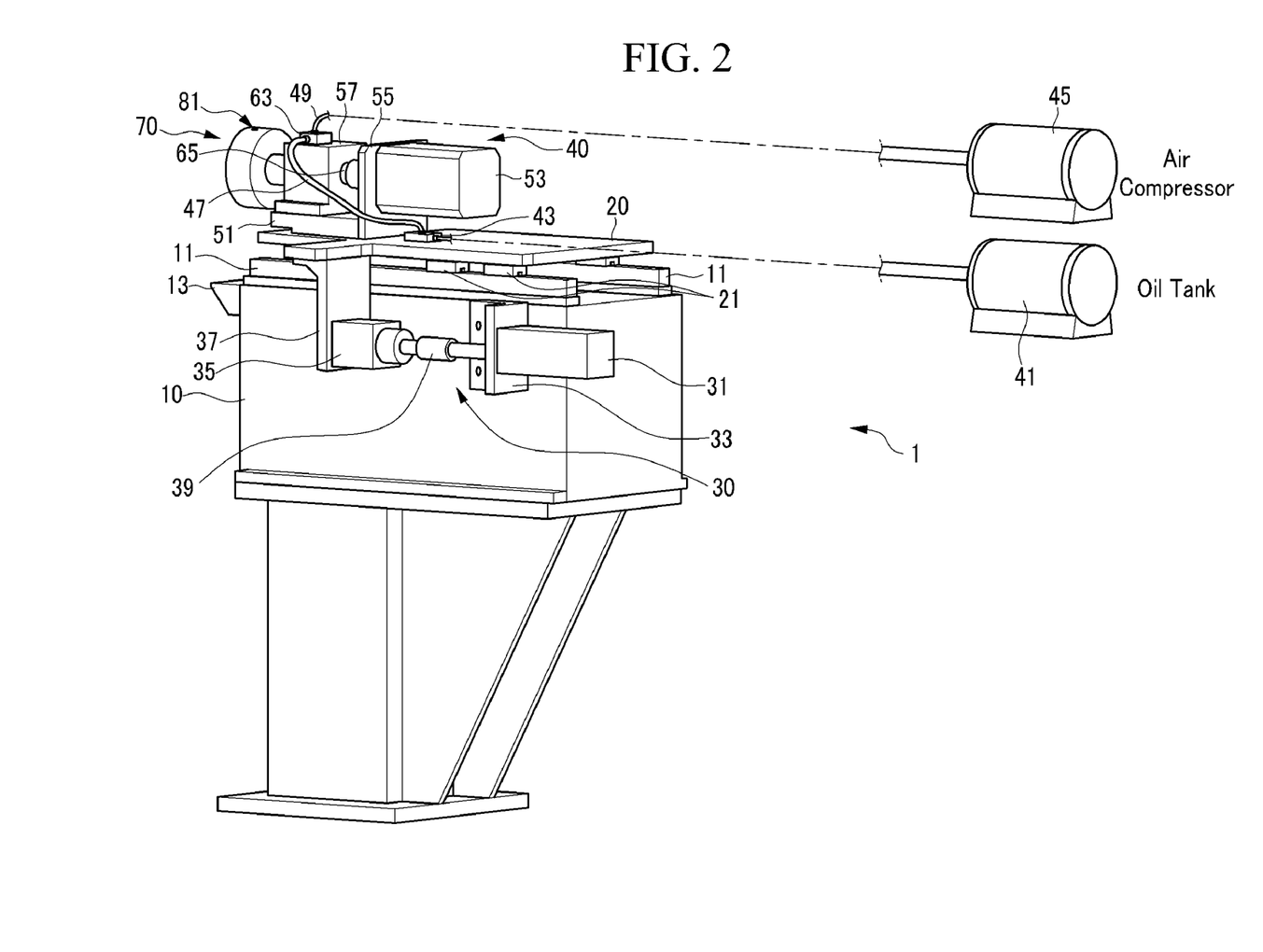
FIG. 2 is a perspective view of an oil-spraying apparatus according to an exemplary embodiment of the present invention.
Figure 3:
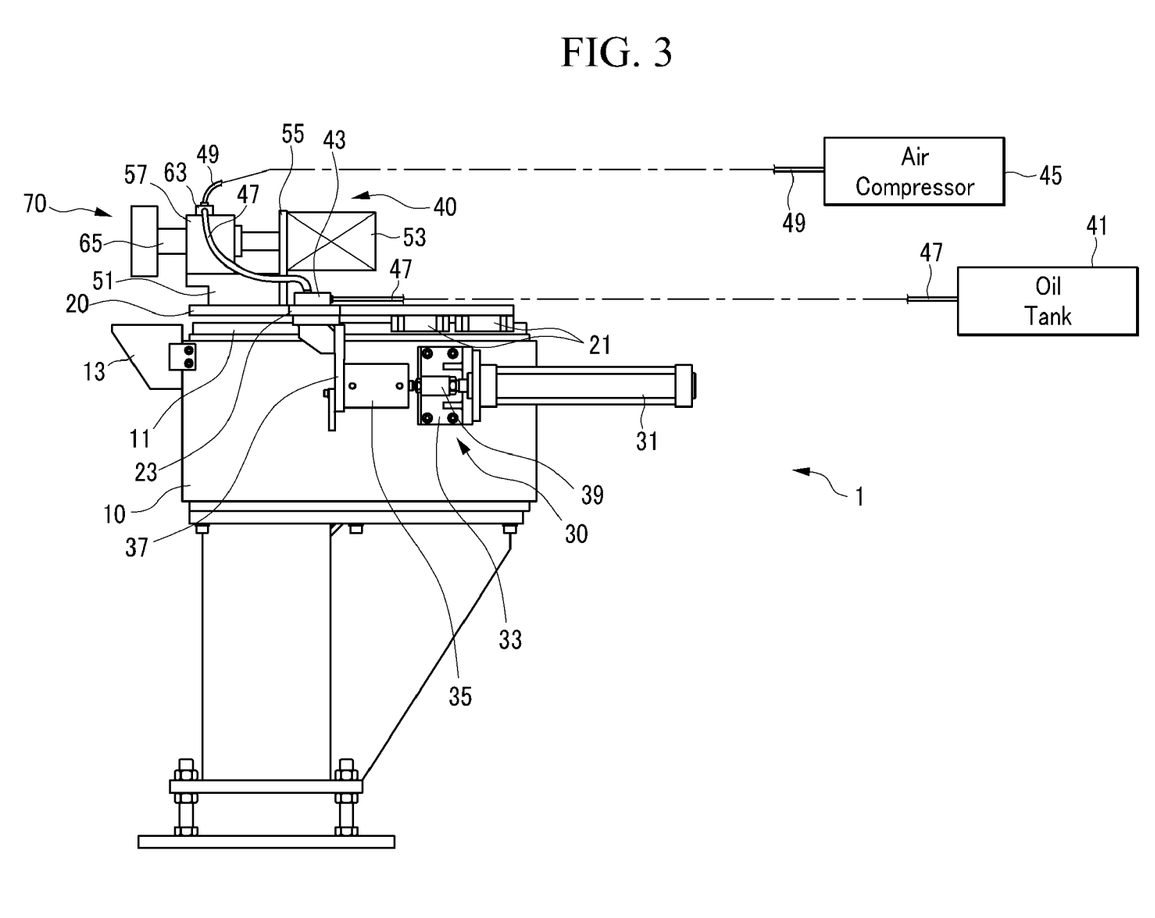
FIG. 3 is a front view of an oil-spraying apparatus according to an exemplary embodiment of the present invention.
Figure 4:
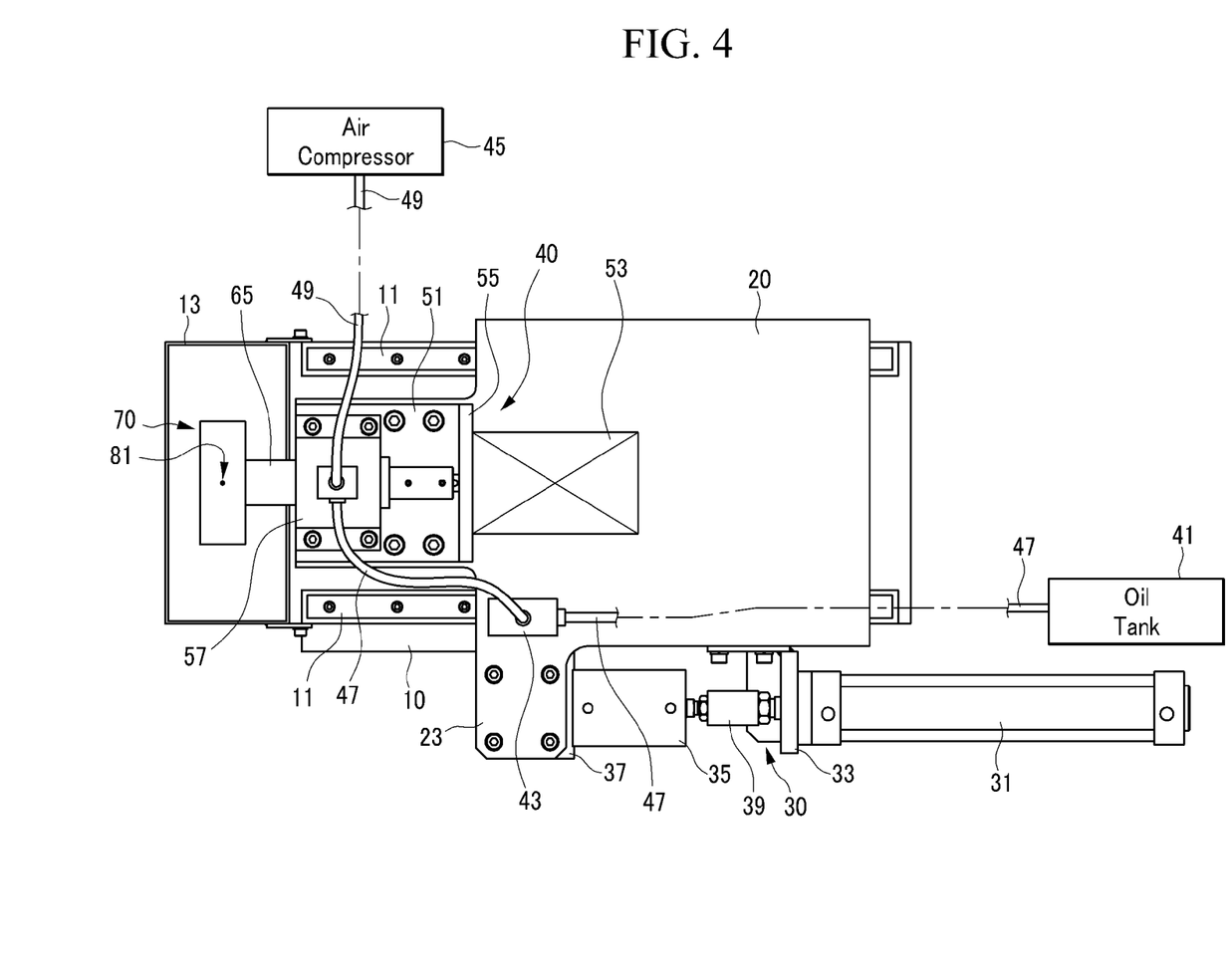
FIG. 4 is a top plan view of an oil-spraying apparatus according to an exemplary embodiment of the present invention.
Figure 5:
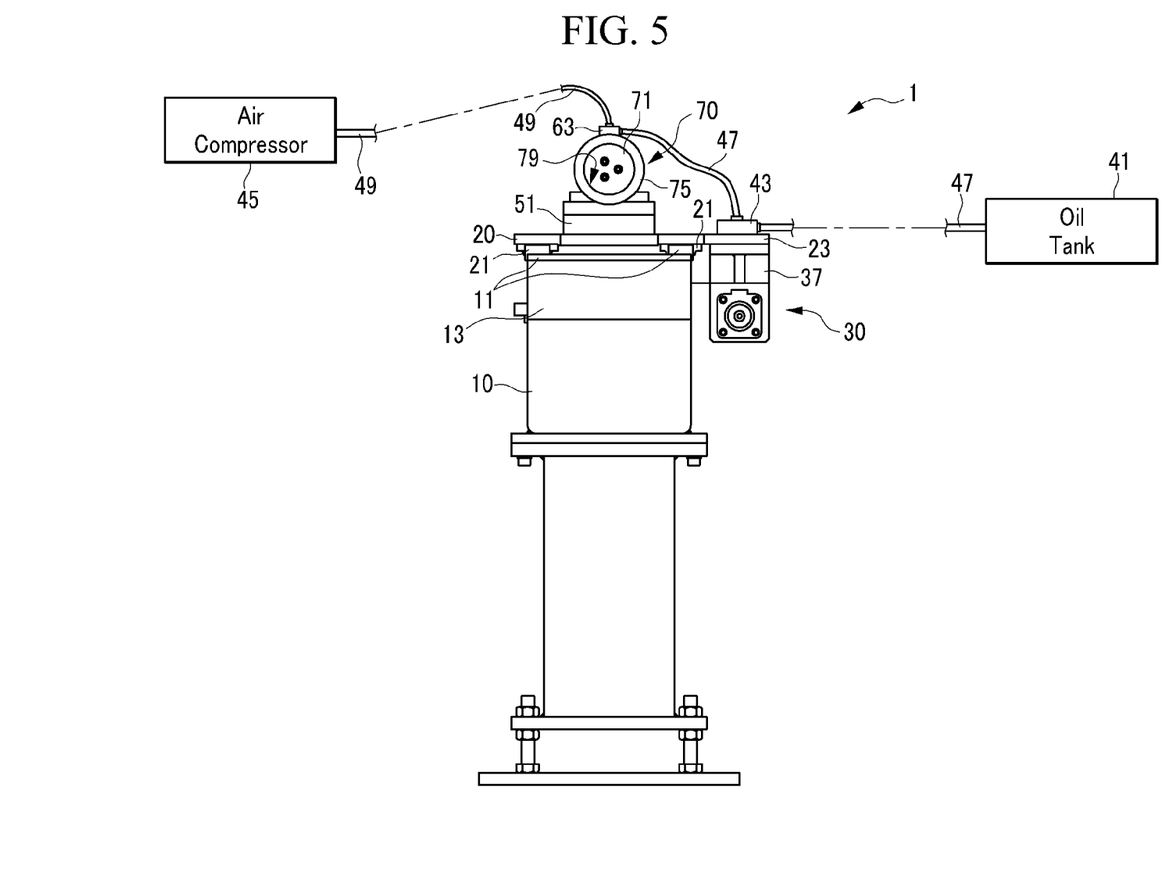
FIG. 5 is a side view of an oil-spraying apparatus according to an exemplary embodiment of the present invention.
Figure 6:
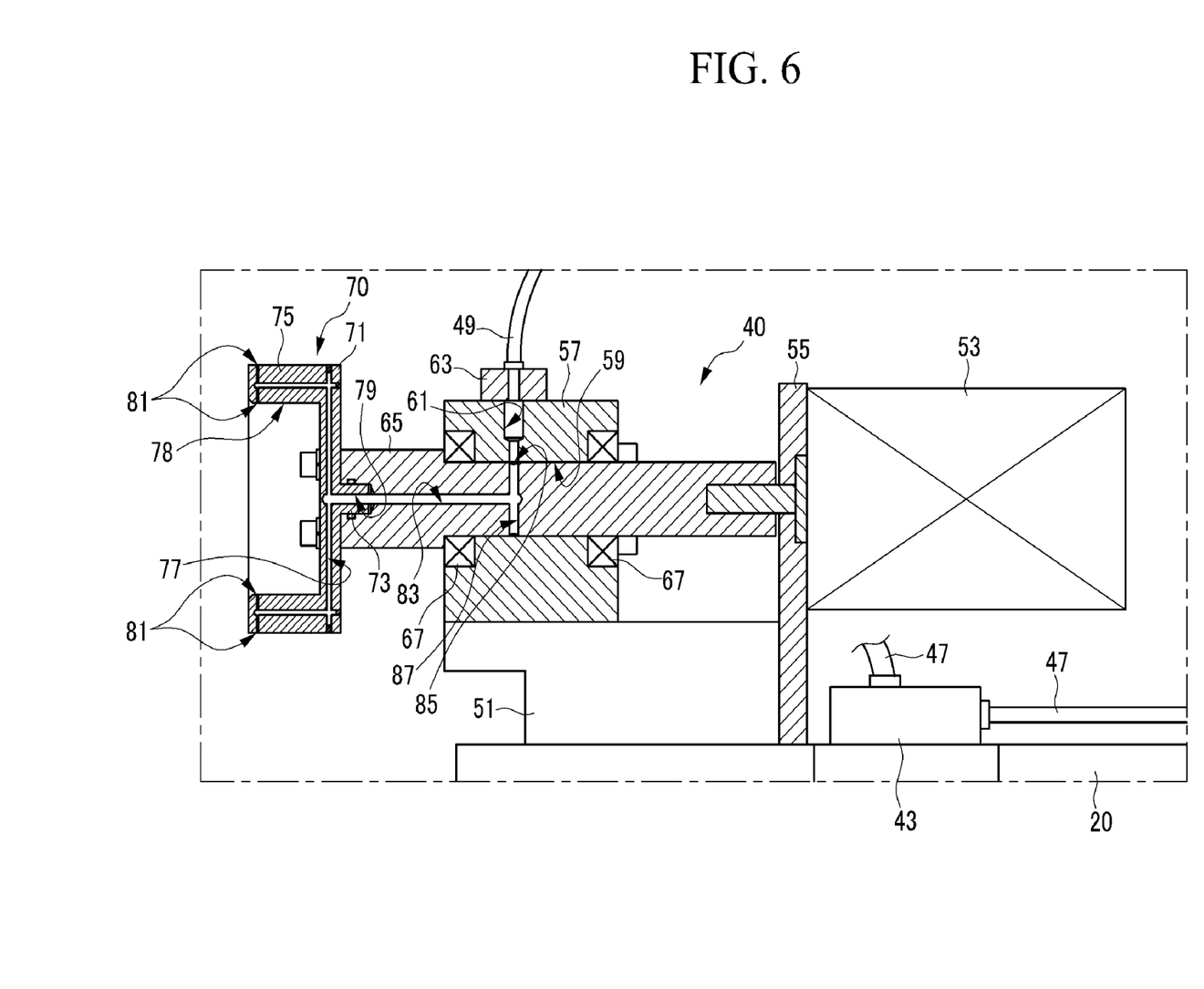
FIG. 6 is an enlarged cross-sectional view taken along the line A-A in FIG. 2.

The oil-spraying unit 40 includes a mounting block 51, a drive motor 53, a shaft housing 57, a connector 63, a shaft 65, and an oil-spreading block 70.

The mounting block 51 is mounted on the upper portion of the mounting plate 20.

The drive motor 53 is mounted at a rear portion of the mounting block 51 through a motor bracket 55.

According to the present exemplary embodiment, the shaft housing 57 is mounted to the mounting block 51 at a front portion of the drive motor 53.

The shaft housing 57 has a penetration hole 59 formed therein along a length direction thereof and an inflow hole 61 formed at an upper portion thereof.

The connector 63 is mounted at an upper portion of the inflow hole 61, and is connected to the oil hose 47 and the air hose 49 so as to flow the compressed air and the oil in the inflow hole 61.

The shaft 65 is rotatably inserted in the penetration hole 59 of the shaft housing 57, and has a rear end connected to a rotation shaft of the drive motor 53.

Herein, bearings 67 for facilitating smooth rotation of the shaft 65 are mounted respectively at the front and rear portions of the penetration hole 59.

In addition, the oil-spreading block 70 is mounted at a front portion of the shaft 65.

The oil-spreading block 70 receives the compressed air and the oil flowing into the inflow hole 61 through the shaft 65, and sprays the oil mixed with the compressed air.

Herein, the oil-spreading block 70 includes a body 71, a connecting portion 73, and a spreading portion 75.

The body 71 has a cylindrical shape, and is provided with a first hydraulic line 77 formed therein.

The connecting portion 73 is integrally protruded from a rear surface of the body 71.

The connecting portion 73 is mounted at a front end of the shaft 65, and has an oil pathway 79 formed therein. The oil pathway 79 is connected to the first hydraulic line 77.

In addition, the spreading portion 75 is integrally protruded from a front surface of the body 71 along an exterior circumference thereof, and is provided with an inserting recess 78 formed at a middle portion of the front surface of the body 71.

Spraying holes 81 are formed by piercing the spreading portion 75 from an exterior circumference to an interior circumference thereof. Respective spraying holes 81 correspond to each other.

The spraying hole 81 is connected to the first hydraulic line 77 and sprays the oil mixed with the compressed air.

Herein, a second hydraulic line 83 connected to the oil pathway 79 is formed in the front portion of the shaft 65 that is connected to the oil-spreading block 70.

In addition, an oil groove 85 is formed at a corresponding position to the inflow hole 61 along an exterior circumference of the shaft 65.

An oil inlet 87 is formed at an interior circumference of the oil groove 85 and is connected to the second hydraulic line 83.

That is, the shaft 65 receives the compressed air and the oil from the connector 63 and flows them into the oil inlet 87 formed at the oil groove 85. The oil, then, is supplied to the oil-spreading block 70 through the second hydraulic line 83.

The oil-spraying unit 40 receives the oil and the compressed air from the connector 63 and sprays them to the oil seal mounting hole 7 and the one end of the crankshaft 9.

At this time, the oil-spreading block 70 receives torque of the drive motor 53 through the shaft 65, and rotates so as to spray the oil in a state that the one end of the crankshaft 9 is inserted in the inserting recess 78.

Hereinafter, operation of the oil-spraying apparatus 1 according to an exemplary embodiment of the present invention will be described in detail, with reference to FIGS. 7 to 10.

Figure 7:
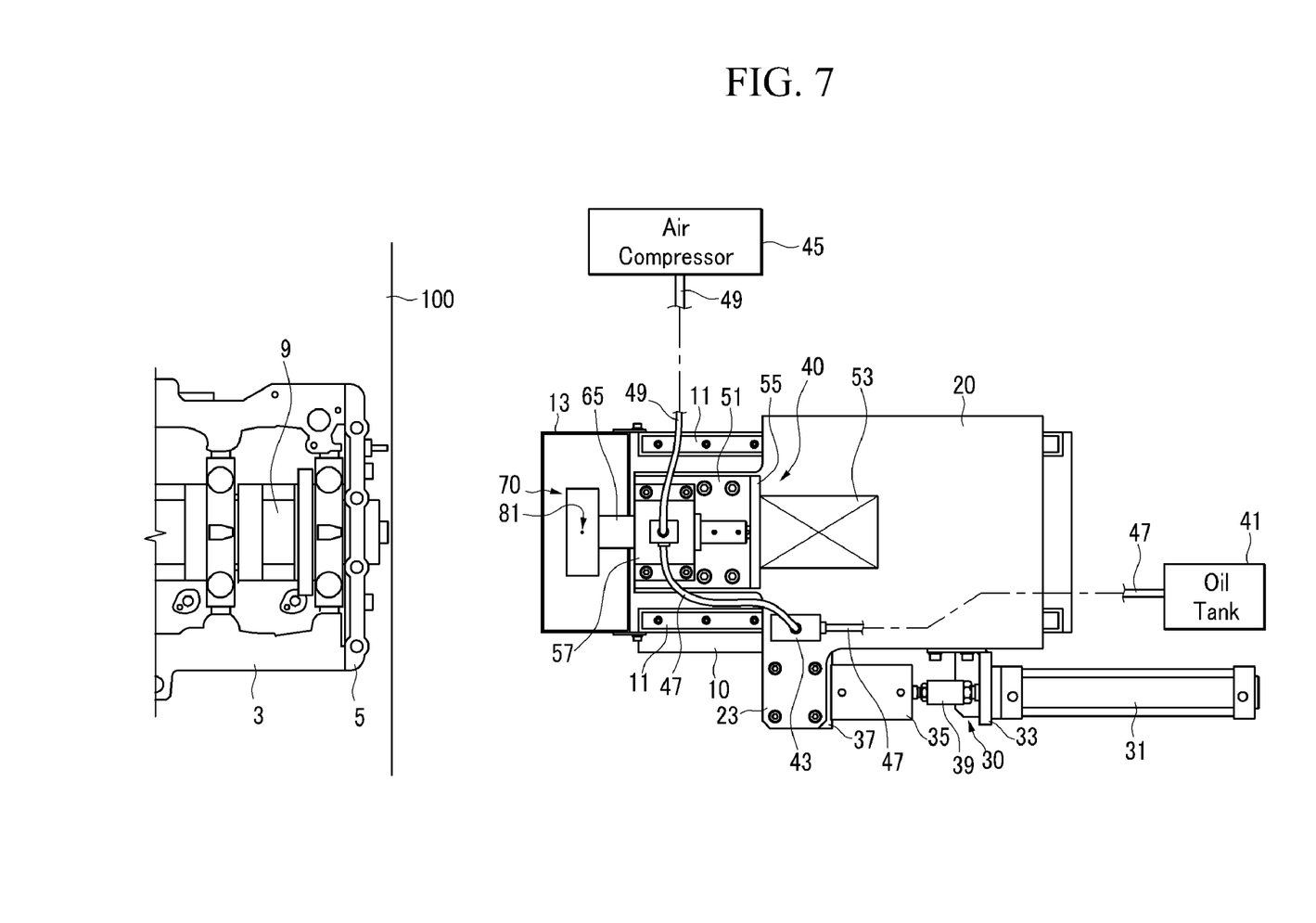
FIG. 7 to FIG. 10 show operation of an oil-spraying apparatus according to an exemplary embodiment of the present invention.

The cylinder block 3 at which the front cover 5 is mounted is moved to a corresponding position to the oil-spraying apparatus 1 by a conveyor 100, and then, is stopped, as shown in FIG. 7.

Figure 8:
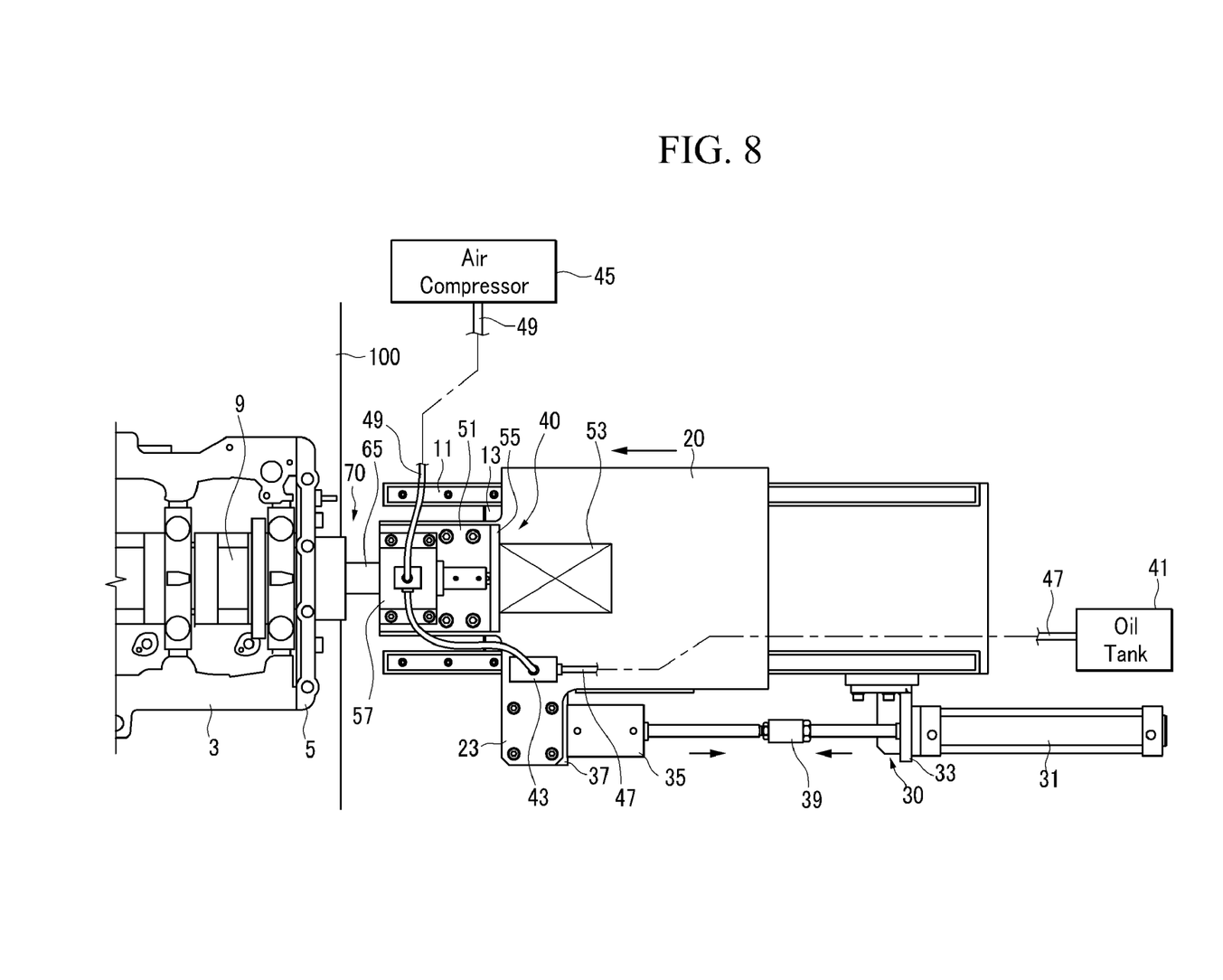

The oil-spraying apparatus 1, as shown in FIG. 8, makes the first and second operating cylinders 31 and 35 of the moving unit 30 move forward so as to transfer the mounting plate 20 on the base frame 10.

In this case, the mounting plate 20 is slid on the guide rail 11 by the guide block 21.

At this time, the first and second operating cylinders 31 and 35 cease their operation when the one end of the crankshaft 9 is inserted in the inserting recess 78 of the oil-spreading block 70.

Figure 9:
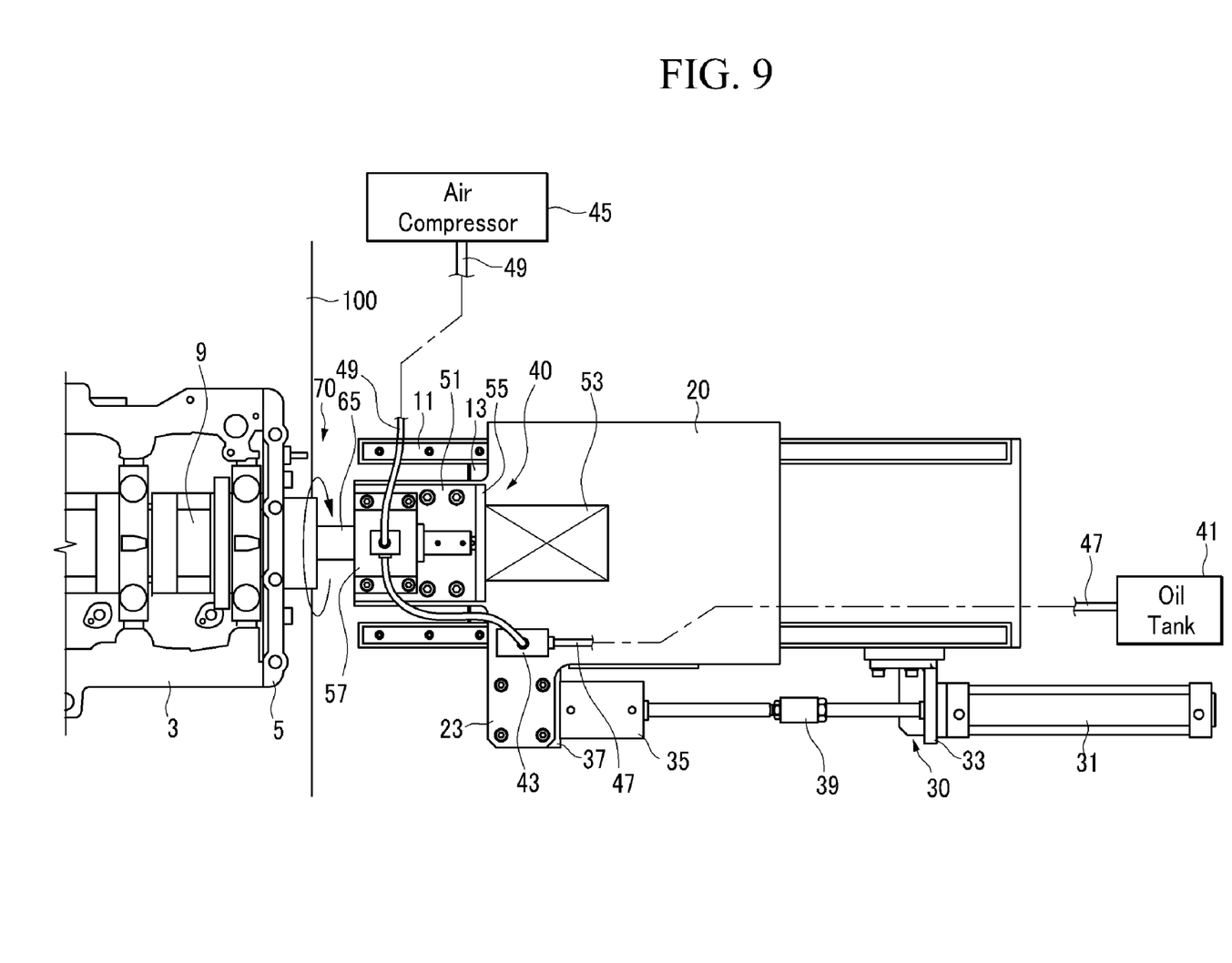

After that, the oil-spreading block 70, as shown in FIG. 9, receives the torque of the drive motor 53 through the shaft 65 and rotates.

At this time, the oil tank 41 and the air compressor 45 respectively supply the oil and the compressed air to the connector 63 through the oil hose 47 and the air hose 49.

Herein, the oil tank 41 supplies the oil to the connector 63 through the oil distributor 43.

The connector 63 flows the compressed air and the oil into the inflow hole 61 of the shaft housing 57.

The compressed air and the oil flowed into the inflow hole 61 are mixed with each other and is flowed along the oil groove 85 of the shaft 65. The oil mixed with the compressed air is flowed into the second hydraulic line 83 of the shaft 65 through the oil inlet 87.

The oil mixed with the compressed air flowed into the second hydraulic line 83 is flowed into the first hydraulic line 77 through the oil pathway 79, and is sprayed through the spraying hole 81.

Figure 10:
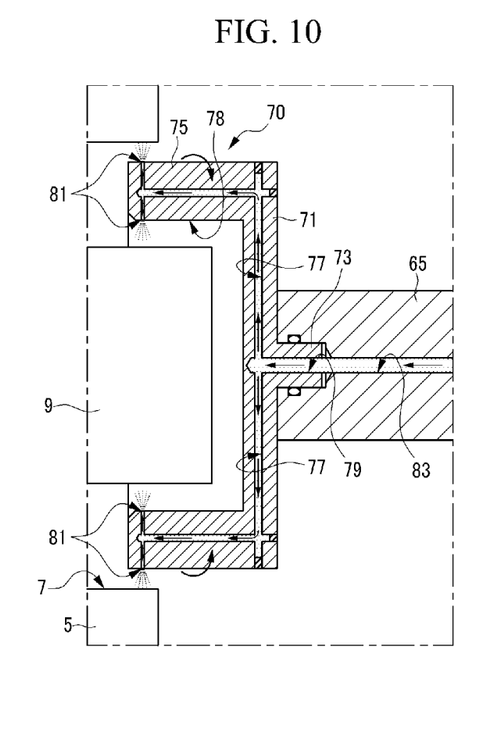

Herein, the oil-spreading block 70, as shown in FIG. 10, rotates between the oil seal mounting hole 7 and the one end of the crankshaft 9, and sprays the oil through the spraying hole 81.

The oil, then, is spread simultaneously on the oil seal mounting hole 7 and the one end of crankshaft 9 through the spraying hole 81 of the rotating oil-spreading block 70. Thereby, oil-spreading process is completed.

The oil-spraying apparatus 1 according to an exemplary embodiment of the present invention repetitively performs above-mentioned processes after spreading the oil to the oil seal mounting hole 7 and the one end of crankshaft 9 completely. After that, the oil-spraying apparatus 1 is returned to its original position.

If a new cylinder block 3 is moved by the conveyor 100, the oil-spraying apparatus 1 performs the above-mentioned processes so as to spray the oil simultaneously to the oil seal mounting hole 7 and the one end of the crankshaft 9.

According to an exemplary embodiment of the present invention, the moving unit 30 and the oil-spraying unit 40 are configured to spray the oil simultaneously to the oil seal mounting hole 7 and the crankshaft 9 of the front cover 5. Therefore, the oil-spraying apparatus 1 prevents damage of the crankshaft 9 caused by misassembling and inflow of foreign substances in press-fit of an oil seal.

Since the oil-spreading block 70 is rotated by the torque of the drive motor 53 when the oil-spraying apparatus 1 according to an exemplary embodiment of the present invention sprays the oil, the oil is homogeneously sprayed to the oil seal mounting hole 7 and the one end of the crankshaft 9 through the spraying hole 81. Therefore, productivity and working ratio of the process lines may be improved.

Since the moving unit and the oil-spraying unit are configured to spray the oil simultaneously to the oil seal mounting hole and the crankshaft of the front cover, the oil-spraying apparatus according to an exemplary embodiment of the present invention may prevent damage of the crankshaft caused by misassembling and inflow of foreign substances in press-fit of an oil seal.

In addition, since the oil-spreading block is rotated by the torque of the drive motor when the oil-spraying apparatus according to an exemplary embodiment of the present invention sprays the oil, the oil is homogeneously sprayed to the oil seal mounting hole and the one end of the crankshaft through the spraying hole. Therefore, productivity and working ratio of the process lines may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An oil-spraying apparatus for spraying oil simultaneously to an oil seal mounting hole formed at a front cover that is mounted at a front surface of a cylinder block, and to a crankshaft having one end portion protruded toward the oil seal mounting hole, the oil-spraying apparatus comprising:
   a base frame provided with a guide rail on an upper surface thereof;
   a mounting plate movably mounted on the guide rail by a rail block;
   a moving unit mounted at one side of the base frame so as to reciprocate the mounting plate on the base frame; and
   an oil-spraying unit mounted on an upper portion of the mounting plate, receiving compressed air and oil, respectively, from an air compressor through an air hose and an oil distributor connected to an oil tank through an oil hose, and spraying the same to the oil seal mounting hole and the one end portion of the crankshaft, the oil spraying unit including:
   a mounting block mounted on the upper portion of the mounting plate,
   a drive motor mounted at a rear portion of the mounting block through a motor bracket,
   a shaft housing mounted to the mounting block at a front portion of the drive motor, and having a penetration hole formed therein along a length direction of the shaft housing and an inflow hole formed at an upper portion of the shaft housing,
   a connector connected to the air hose and the oil hose, and configured to receive the compressed air and the oil supplied from the air hose and the oil hose into the inflow hole,
   a shaft rotatably inserted in the penetration hole of the shaft housing, and having a rear end connected to a rotation shaft of the drive motor,
   an oil-spreading block mounted at a front portion of the shaft to receive the compressed air and the oil flowing into the inflow hole through the shaft, and spray the oil mixed with the compressed air and configured to be received between the oil seal mounting hole and the crankshaft, wherein a plurality of spaying holes are formed around the exterior circumference of the oil spreading block,
a body of a cylindrical shape having a first hydraulic line formed therein;
a connecting portion integrally protruded from a rear surface of the body, mounted at a front end of the shaft, and having an oil pathway formed therein, the oil pathway being connected to the first hydraulic line; and
a spreading portion integrally protruded from a front surface of the body along an exterior circumference thereof, and provided with an inserting recess formed at a middle portion of the front surface of the body and spraying holes formed by piercing the spreading portion from an exterior circumference to an interior circumference thereof, the spraying holes facing each other and being connected to the first hydraulic line.

2. The oil-spraying apparatus of claim 1, wherein the moving unit comprises:
a first operating cylinder having a first operating rod, and mounted at the base frame through a first mounting bracket;
a second operating cylinder having a second operating rod, and mounted on a lower portion of the mounting plate through a second mounting bracket in a state of facing the first operating cylinder; and
a joint block connecting the first and second operating rods to each other.

3. The oil-spraying apparatus of claim 2, wherein one side of the mounting plate is protruded so as to form a mounting portion at which the second mounting bracket is mounted, and the oil distributor is mounted on the upper portion of the mounting plate.

4. The oil-spraying apparatus of claim 1, wherein a second hydraulic line connected to the oil pathway is formed in the front portion of the shaft that is connected to the oil-spreading block.

5. The oil-spraying apparatus of claim 4, wherein an oil groove is formed at a corresponding position to the inflow hole along an exterior circumference of the shaft, and an oil inlet connected to the second hydraulic line is formed at an interior circumference of the oil groove.

6. The oil-spraying apparatus of claim 1, wherein bearings are mounted respectively at front and rear portions of the penetration hole.

7. An oil-spraying apparatus for spraying oil simultaneously to an oil seal mounting hole formed at a front cover that is mounted at a front surface of a cylinder block, and to a crankshaft having one end portion protruded toward the oil seal mounting hole, the oil-spraying apparatus comprising:
a base frame provided with a guide rail on an upper surface thereof;
a mounting plate movably mounted on the guide rail by a rail block;
a moving unit mounted at one side of the base frame so as to reciprocate the mounting plate on the base frame; and
an oil-spraying unit mounted on an upper portion of the mounting plate, receiving compressed air and oil, respectively, from an air compressor through an air hose and an oil distributor connected to an oil tank through an oil hose, and spraying the same to the oil seal mounting hole and the one end portion of the crankshaft, the oil spraying unit including an oil-spreading block mounted at a front portion of a rotatable shaft to receive the compressed air and the oil flowing into an inflow hole through the rotatable shaft, and spray the oil mixed with the compressed air, the oil-spreading block configured to be received between the oil seal mounting hole and the crankshaft, wherein a plurality of spraying holes are formed around an interior and exterior circumference of the oil-spreading block to supply oil simultaneously to the oil seal mounting hole and the crankshaft.

* * * * *